(12) United States Patent
Brewer et al.

(10) Patent No.: US 6,226,269 B1
(45) Date of Patent: May 1, 2001

(54) ELIMINATION OF INVALID DATA IN LOOP NETWORK

(75) Inventors: David Brewer, Anaheim; David Baldwin, Irvine; Karl M. Henson, Rancho Santa Margarita, all of CA (US)

(73) Assignee: Emulex Corporation, Costa Mesa, CA (US)

( * ) Notice: Subject to any disclaimer, the term of this patent is extended or adjusted under 35 U.S.C. 154(b) by 0 days.

(21) Appl. No.: 09/071,930

(22) Filed: May 1, 1998

(51) Int. Cl.$^7$ .................................................. H04L 12/26
(52) U.S. Cl. ............................. 370/245; 370/252; 371/30
(58) Field of Search .................................. 370/241, 242, 370/243, 244, 245, 250, 252, 535, 410, 522, 528; 371/48, 49.1, 47.1, 30, 31

(56) References Cited

U.S. PATENT DOCUMENTS

| | | |
|---|---|---|
| 4,849,969 | 7/1989 | Annamalai . |
| 5,495,580 | 2/1996 | Osman . |
| 5,522,047 | 5/1996 | Grow et al. . |
| 5,570,361 | 10/1996 | Norizuki et al. . |
| 5,638,512 | 6/1997 | Osman et al. . |
| 5,659,718 | 8/1997 | Osman et al. . |
| 5,799,003 | 8/1998 | Fujimaki et al. . |

*Primary Examiner*—Huy D. Vu
(74) *Attorney, Agent, or Firm*—Fish & Richardson P.C.

(57) ABSTRACT

A hub port in a hub of a loop network which detects and replaces invalid data and invalid control signals in the datastream of the loop. The hub port detects invalid data and invalid control signals or primitives received from an attached node port and substitutes buffer data or valid primitives. The hub port substitutes buffer data or primitives which have correct running disparity for the datastream at the point of substitution. In another implementation, an error detection device is included in a loop network and monitors the datastream of the loop network. The error detection device detects invalid data and invalid control signals or primitives received from an upstream node in the loop and substitutes buffer data or valid primitives. The error detection device substitutes buffer data or primitives which have correct running disparity for the datastream at the point of substitution.

28 Claims, 5 Drawing Sheets

ELIMINATION OF INVALID DATA IN LOOP NETWORK

TECHNICAL FIELD

The present invention relates to electronic network communications systems, and more specifically to automatic elimination of invalid data from a node or loop segment in a loop network.

BACKGROUND INFORMATION

Electronic data systems are frequently interconnected using network communication systems. Area-wide networks and channels are two approaches that have been developed for computer network architectures. Traditional networks (e.g., LAN's and WAN's) offer a great deal of flexibility and relatively large distance capabilities. Channels, such as the Enterprise System Connection (ESCON) and the Small Computer System Interface (SCSI), have been developed for high performance and reliability. Channels typically use dedicated short-distance connections between computers or between computers and peripherals. Features of both channels and networks have been incorporated into a new network standard known as "Fibre Channel". Fibre Channel systems combine the speed and reliability of channels with the flexibility and connectivity of networks. Fibre Channel products currently can run at very high data rates, such as 266 Mbps or 1062 Mbps. These speeds are sufficient to handle quite demanding applications, such as uncompressed, full motion, high-quality video. ANSI specifications, such as X3.230-1994, define the Fibre Channel network. This specification distributes Fibre Channel functions among five layers. The five functional layers of the Fibre Channel are: FC-0 —the physical media layer; FC-1 —the coding and encoding layer; FC-2 —the actual transport mechanism, including the framing protocol and flow control between nodes; FC-3 —the common services layer; and FC-4 —the upper layer protocol.

There are generally three ways to deploy a Fibre Channel network: simple point-to-point connections; arbitrated loops; and switched fabrics. The simplest topology is the point-to-point configuration, which simply connects any two Fibre Channel systems directly. Arbitrated loops are Fibre Channel ring connections that provide shared access to bandwidth via arbitration. Switched Fibre Channel networks, called "fabrics", are a form of cross-point switching.

Conventional Fibre Channel Arbitrated Loop ("FC-AL") protocols provide for loop functionality in the interconnection of devices or loop segments through node ports. However, direct interconnection of node ports is problematic in that a failure at one node port in a loop typically causes the failure of the entire loop. This difficulty is overcome in conventional Fibre Channel technology through the use of hubs. Hubs include a number of hub ports interconnected in a loop topology. Node ports are connected to hub ports, forming a star topology with the hub at the center. Hub ports which are not connected to node ports or which are connected to failed node ports are bypassed. In this way, the loop is maintained despite removal or failure of node ports.

Figure 1:
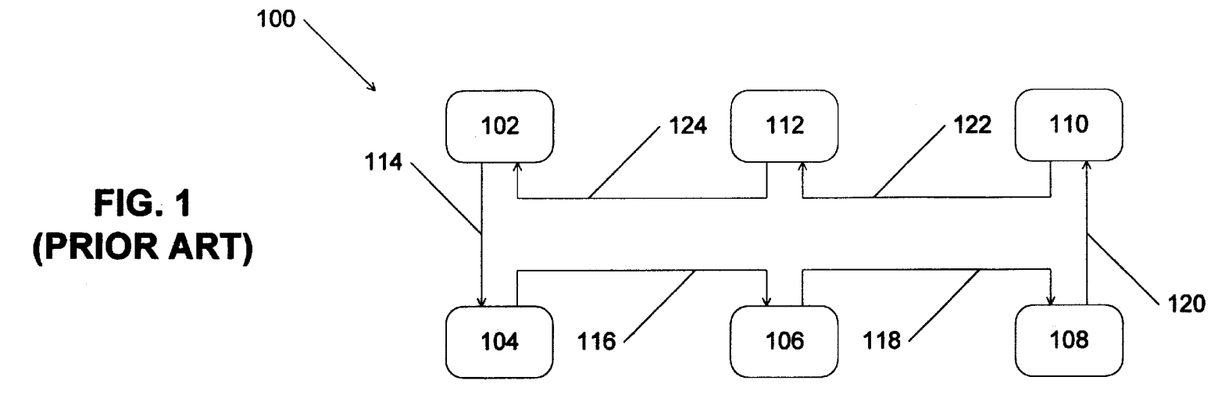
FIG. 1 shows a prior art loop of directly interconnected node ports.

More particularly, an FC-AL network is typically composed of two or more node ports linked together in a loop configuration forming a single data path. Such a configuration is shown in FIG. 1. In FIG. 1, six node ports 102, 104, 106, 108, 110, 112 are linked together by data channels 114, 116, 118, 120, 122, 124. In this way, a loop is created with a datapath from node port 102 to node port 104 through data channel 114 then from node port 104 to node port 106 through data channel 116, and so on to node port 102 through data channel 124.

When there is a failure at any point in the loop, the loop datapath is broken and all communication on the loop halts. For example, if node port 104 fails, data no longer passes through node port 104. A failure may also occur in a data channel between node ports, such as by a physical break in the wire or electromagnetic interference causing significant data corruption or loss at that point. At this point, loop 100 has been broken. Data no longer flows in a circular path and the node ports are no longer connected to one another. The loop has, in effect, become a unidirectional linked list of node ports.

A conventional technique to avoid a broken node port-to-node port loop introduces a hub within a loop. A hub creates a physical configuration of node ports in a star pattern, but the virtual operation of the node ports continues in a loop pattern. The connection process (i.e., sending data between node ports) and interaction with the hubs is effectively transparent to the node ports connected to the hub which perceive the relationship as a standard FC-AL configuration.

Figure 2:
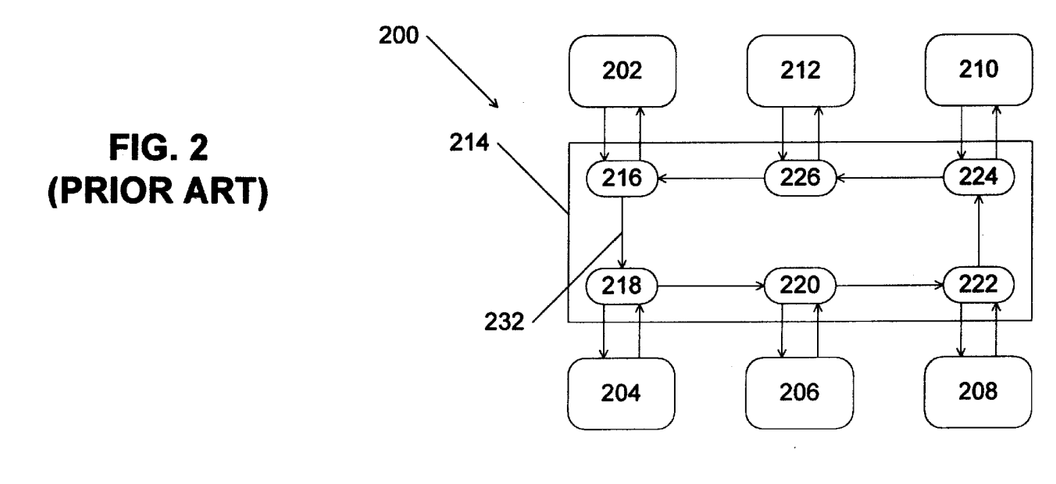
FIG. 2 shows a prior art loop including a hub.

FIG. 2 illustrates an arbitrated loop 200 with a centrally connected hub. Similar to loop 100 illustrated in FIG. 1, loop 200 includes six node ports 202, 204, 206, 208, 210, 212, each attached to a hub 214. Hub 214 includes six hub ports 216, 218, 220, 222, 224, 226 where each hub port is connected to another hub port in a loop topology by a sequence of internal hub links. In this way, node ports 202–212 are each connected to a corresponding hub port 216–226. Thus, node ports 202–212 operate as though connected in a loop fashion as illustrated in FIG. 1. Data typically flows into a hub port from an upstream hub port, into the attached node port, back from the node port to the hub port, and out of the hub port to a downstream hub port.

When a node port or a data channel fails, the loop is maintained by bypassing the failed node port. In a conventional hub, when a hub port no longer receives data from a node port, the hub port goes into a bypass mode. In bypass mode, rather than passing data received on the data channel from the node port, the hub port passes data received along the internal hub link from the previous hub port.

The content of a datastream of an FC-AL network is defined by FC-AL protocols. Characters are constantly moving through the loop from one port to the next. These characters may be actual data or loop control signals. Loop control signals are always present in the datastream except when a data frame is being sent from a source node port to a destination node port. Under FC-AL protocols, the loop control signals are ordered sets, primitive signals and primitive sequences. A data frame is an uninterrupted stream of data preceded by a special ordered set called a Start Of Frame ("SOF") and succeeded by a special ordered set called a End Of Frame ("EOF").

A datastream of encoded characters ideally always has a valid "running disparity". The encoded characters are defined according to a conventional 8B/10B encoding scheme, defined in Fibre Channel protocols. The running disparity at any given point in the datastream is the difference between the number of 1's and 0's in the bit encoding of a character. A character with more 1's than 0's is has a positive running disparity. A character with more 0's than 1's is has a negative running disparity. A character with an equal number of 1's and 0's is has a neutral running disparity. An encoder transmits a positive, negative, or neutral disparity encoded character that either does not affect the running disparity of the datastream or changes the running disparity from negative to positive or positive to negative. If the encoder sends a negative disparity encoded character when the running disparity is negative, or a positive encoded character when the running disparity is positive, a running disparity error results. This error typically introduces an invalid character into the loop.

Ideally, all the data in the loop are valid data characters, all the control signals are valid ordered sets, there are no running disparity errors, data is properly formatted into data frames, and only ordered sets are present between data frames. Typically, errors are sometimes introduced into loops, such as when devices are inserted into the loop, bad cables are used, or when a device does not comply with FC-AL protocols.

The inventors have determined that it would be desirable to provide an apparatus and method for replacing invalid data and invalid control signals in a loop network to prevent errors from propagating throughout the loop.

SUMMARY

The preferred embodiment of the invention provides a hub port in a hub of a loop network which detects and replaces invalid data and invalid control signals in the datastream of the loop. The hub port detects invalid data or invalid control signals or primitives received from an attached node port and substitutes buffer data or valid primitives. The hub port substitutes buffer data or primitives which have correct running disparity for the datastream at the point of substitution.

In a Fibre Channel implementation, the hub port detects data and invalid ordered sets which are between data frames and replaces that data or invalid ordered set with the current fill word. The hub port detects invalid ordered sets within data frames and replaces such invalid ordered sets with an EOFA ordered set. The hub port also checks the running disparity of the datastream at the point of substitution and inserts ordered sets which have correct running disparity.

In another implementation, an error detection device is included in a loop network and monitors the datastream of the loop network. The error detection device detects invalid data and invalid control signals or primitives received from an upstream node in the loop and substitutes buffer data or valid primitives. The error detection device substitutes buffer data or primitives which have correct running disparity for the datastream at the point of substitution.

DETAILED DESCRIPTION

The invention provides apparatus and methods for detecting invalid data and invalid primitives in the datastream of a loop network and substituting buffer data or valid primitives into the datastream. The invention is explained below in the context of a Fibre Channel Arbitrated Loop ("FC-AL") network as an illustration of the preferred embodiment. However, the invention may have applicability to networks with similar characteristics as FC-AL networks.

In the preferred embodiment, each hub port in a loop network connects an attached node port to the loop (recall FIG. 2). Each hub port includes components to detect invalid data and invalid primitives. Upon detecting invalid data or invalid primitives, the hub port substitutes buffer data or valid primitives for the detected invalid data or invalid primitives. The hub port also ensures the running disparity of the datastream is valid by inserting valid primitives with appropriate disparity.

Figure 3A:
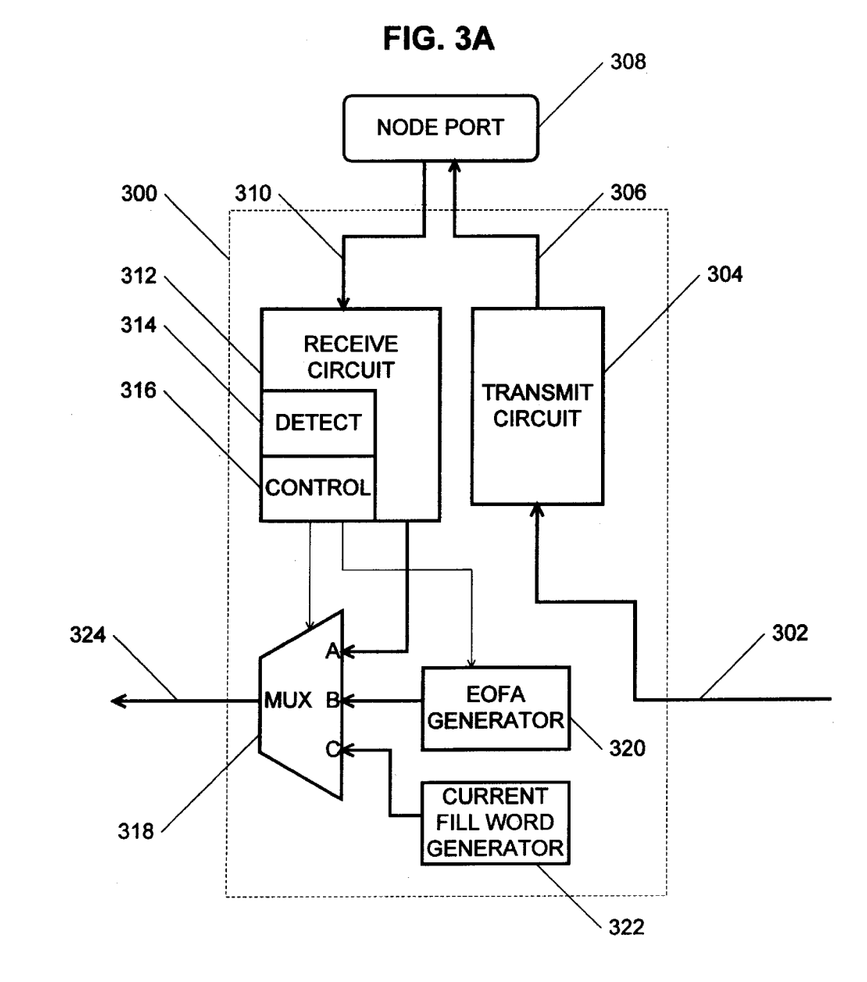
FIG. 3A shows a block diagram of a hub port of the preferred embodiment.

As shown in FIG. 3A, a hub port 300 according to the preferred embodiment includes an incoming internal hub link 302 connected to a transmit circuit 304. Incoming internal hub link 302 carries data from an upstream hub port (not shown) to hub port 300 and into transmit circuit 304. Transmit circuit 304 transmits the data to node port 308 on a data channel 306 in a form usable to node port 308. In an FC-AL implementation, transmit circuit 304 preferably encodes the data, preferably using 8B/10B encoding, and serializes the data before transmitting the data to node port 308.

Node port 308 transmits data back to hub port 300 on a data channel 310. Data channel 310 is connected to a receive circuit 312. In an FC-AL implementation, receive circuit 312 preferably deserializes and decodes the data from node port 308, preferably using 10B/8B decoding. Receive circuit 312 includes a detect circuit 314 and an output control circuit 316. Detect circuit 314 monitors the content of the datastream from node port 308 and sends control signals to output control circuit 316. Receive circuit 312 sends data to a first data input A of a switching device such as a multiplexer 318. A primitive generator 320 is connected to a second data input B of multiplexer 318. In an FC-AL implementation, primitive generator 320 preferably generates EOFA ordered sets. A buffer data generator 322 is connected to a third data input C of multiplexer 318. In an FC-AL implementation, buffer data generator 322 preferably generates current fill words according to FC-AL protocols. An output of multiplexer 318 is connected to an outgoing internal hub link 324. Output control circuit 316 is connected to a control input of multiplexer 318 to select the data input of multiplexer 318 to connect to outgoing internal hub link 324. In addition, output control circuit 316 is preferably connected to primitive generator 320 to control the selection of primitives to be output by primitive generator 320. Outgoing internal hub link 324 sends data to a downstream hub port (not shown) in the loop.

In operation, while valid data and valid primitives are being received from node port 308, output control circuit 316 selects input A of multiplexer 318 so that the valid data and primitives are output on outgoing internal hub link 324. Detect circuit 314 monitors the datastream received from node port 308. When detect circuit 314 detects an invalid primitive inside a data frame, detect circuit 314 sets a frame error flag. Alternatively, detect circuit 314 sets the frame error flag in response to detecting invalid data or invalid primitives inside a data frame. In response to setting of the frame error flag, output control circuit 316 selects data input B of multiplexer 318 so that a valid primitive is substituted for the invalid primitive. In addition, detect circuit 314 checks the running disparity of the datastream at the point of the error (ie., the running disparity of the word preceding the invalid primitive). Detect circuit 314 sends a disparity signal to primitive generator 320 so that primitive generator 320 outputs a primitive which maintains valid running disparity. When detect circuit 314 detects invalid data or an invalid primitive between data frames, detect circuit 314 sets an interframe error flag. In response to setting of the interframe error flag, output control circuit 316 selects data input C of multiplexer 318 so that buffer data is substituted for the invalid data or invalid primitive.

The frame error flag and the interframe error flag are cleared after the detected invalid word (data or primitive) has been properly replaced. After the error flag has been cleared, output control circuit 316 selected input A of multiplexer 318 again so that data from receive circuit 312 is output by mulitplexor 318. Thus, the detection and replacement of invalid words preferably occurs on a word-by-word basis.

In an FC-AL implementation, when detect circuit 314 detects an ordered set inside a data frame (i.e., after receiving a valid SOF and before receiving a proper succeeding EOF), and that ordered set is not a proper EOF ordered set which terminates the data frame with the correct running disparity, detect circuit 314 sets the frame error flag. An EOF ordered set inside a data frame which does not have the correct running disparity is not a proper EOF ordered set. Any ordered set other than an EOF ordered set inside a data frame is also invalid. In response to setting of the frame error flag, output control circuit 316 selects input B of multiplexer 318 so that a valid primitive is output by multiplexer 318 from primitive generator 320. Primitive generator 320 preferably generates EOFA ordered sets. In addition, output control circuit 316 sends a disparity signal to primitive generator 320 so that primitive generator preferably outputs an EOFA ordered set with correct running disparity.

When detect circuit 314 detects an invalid Fibre Channel word outside a data frame (i.e., after a EOF ordered set has been received and before receiving a succeeding SOF ordered set), detect circuit 314 sets the interframe error flag. Invalid Fibre Channel words outside a data frame include data (actual data must be inside a data frame under FC-AL protocols) and invalid ordered sets. An ordered set may be invalid because the running disparity of the ordered sets is invalid. In response to setting of the interframe error flag, output control circuit 316 selects input C of multiplexer 318 so that a current fill word is output by multiplexer 318. The current fill word is defined by FC-AL protocols. The current fill word is preferably a known good word to be substituted in place of invalid words.

Figure 3B:
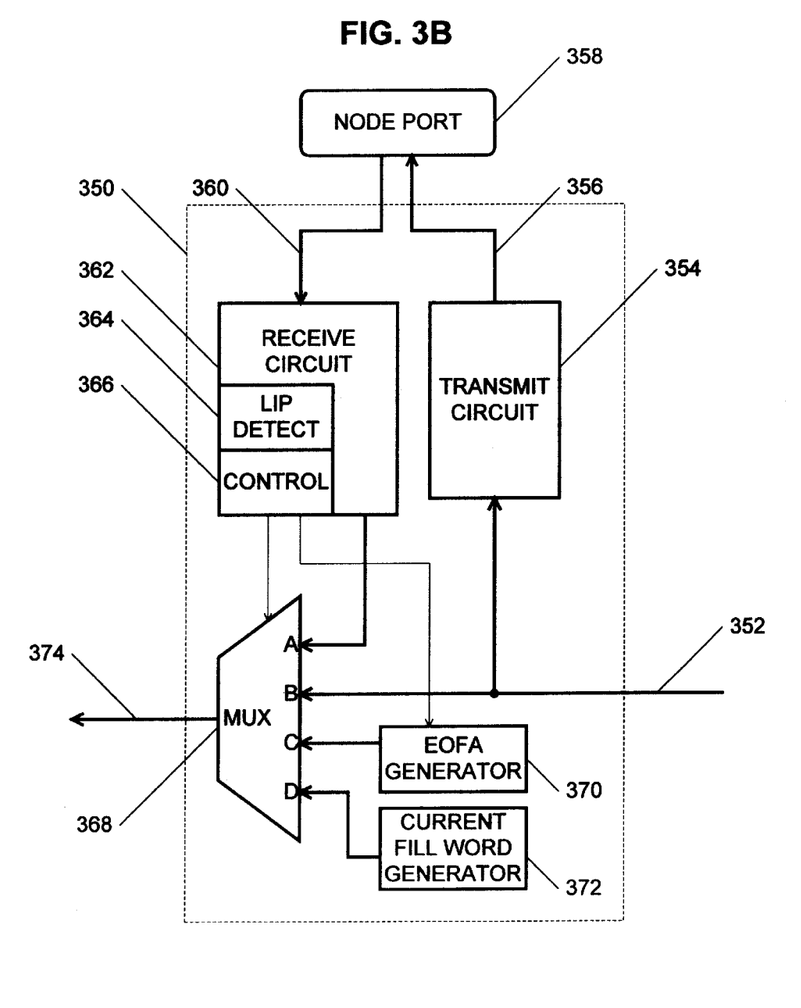
FIG. 3B shows a block diagram of an alternative embodiment of a hub port.

As shown in FIG. 3B, in an alternative implementation of a hub port 350, an incoming internal hub link 352 is connected to a second data input B of a multiplexer 368. A primitive generator 370 is connected to a third input C of multiplexer 368 and a buffer data generator 372 is connected to a fourth data input D of multiplexer 368. An output control circuit 366 selects data input B of multiplexer 368 when hub port 350 is in bypass mode so that data from an upstream hub port (not shown) is passed to a down stream hub port (not shown). In other respects, the operation of hub port 350 is similar to the operation described above with respect to hub port 300 in FIG. 3A.

In another implementation an error detection device is inserted into a loop network of directly interconnected nodes. The error detection device is placed between two nodes and monitors the datastream for errors.

Figure 4A:
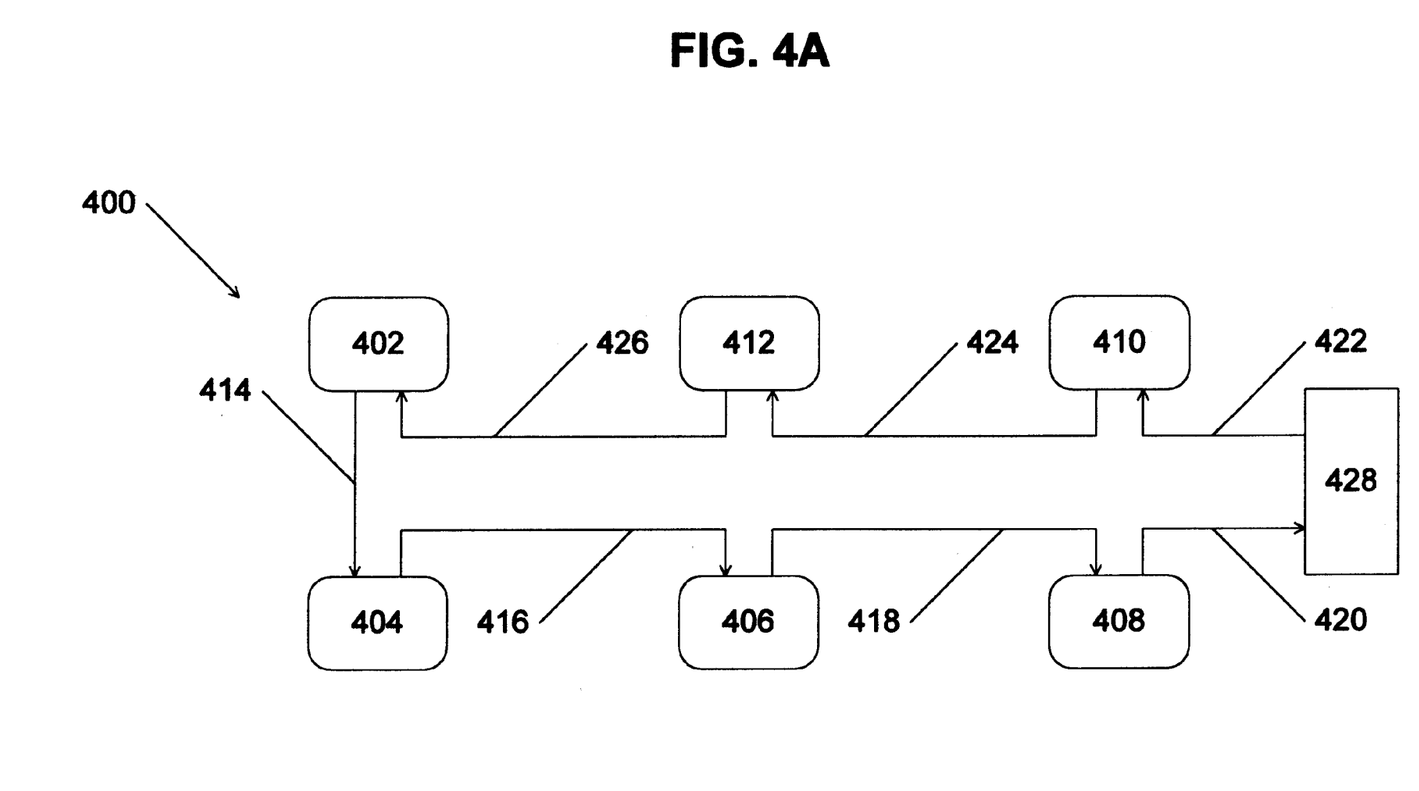
FIG. 4A shows a loop including an alternative embodiment of the invention in the loop.

As shown in FIG. 4A, a loop 400 of nodes 402, 404, 406, 408, 410, 412 are connected by data channels 414, 416, 418, 420, 422, 424, 426 in a manner similar to that shown in FIG. 1. However, an error detection device 428 is inserted between node 408 and node 410. Data channel 420 carries data from node 408 to error detection device 428. Data channel 422 carries data from error detection device 428 to node 410. Thus the datastream of the loop flows through each node 402–412 and through error detection device 428. Alternatively, multiple error detection devices may be inserted into the loop, such as one device between each pair of neighboring nodes.

Figure 4B:
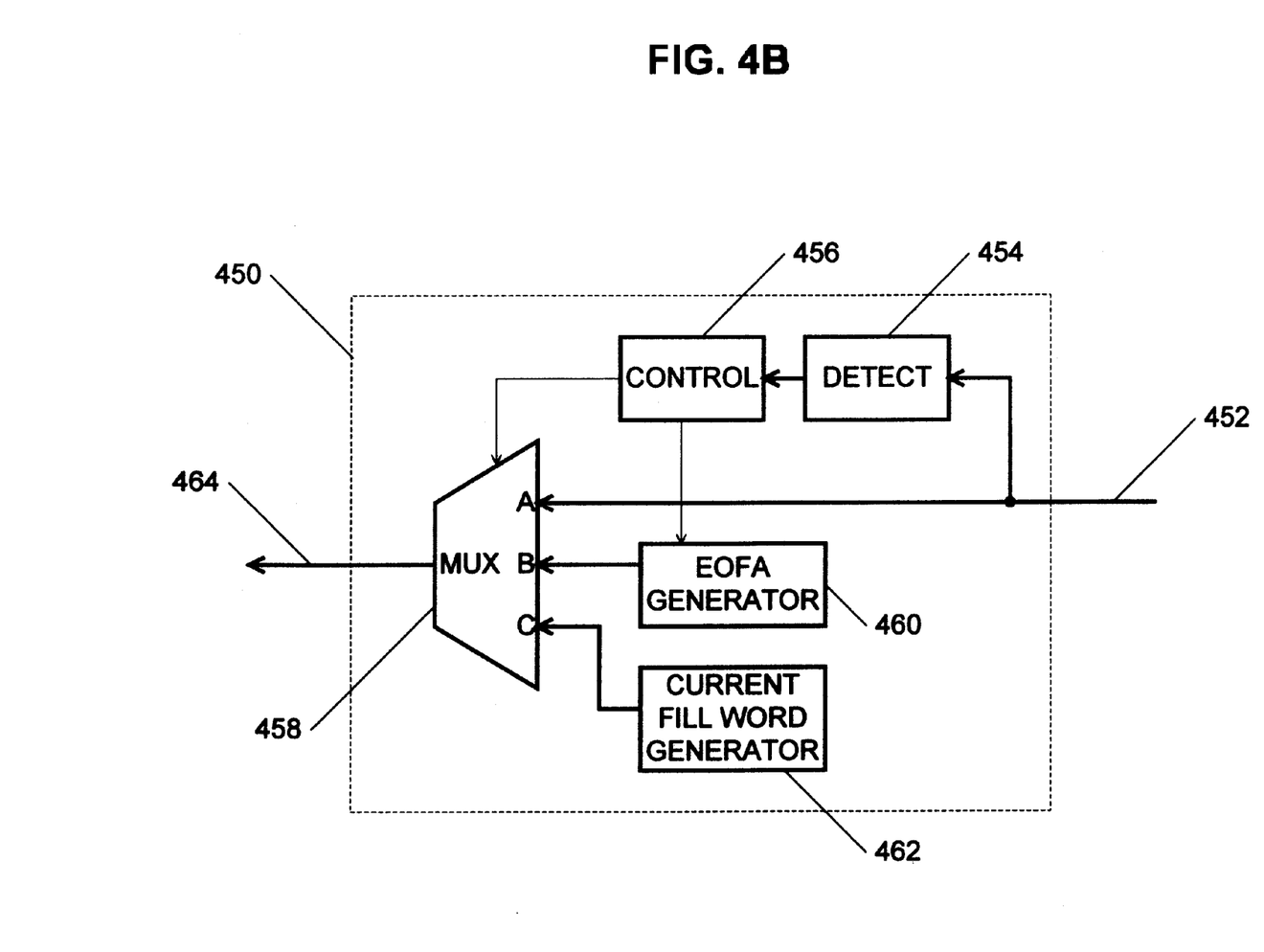
FIG. 4B shows a block diagram of an alternative embodiment of the invention.

As shown in FIG. 4B, the architecture of an error detection device 450 is similar to the architecture of the hub port implementations described above with respect to FIGS. 3A and 3B. An incoming loop link 452 carries data into error detection device 450 from an upstream node (not shown) in the loop (e.g., data channel 420 entering error detection device 428 in FIG. 4A). Incoming loop link 452 is connected to a detect circuit 454 and a first data input A of a switching device such as a multiplexer 458. Detect circuit 454 monitors the content of the incoming loop link and sends control signals to an output control circuit 456. A primitive generator 460 is connected to a second data input B of multiplexer 458. In an FC-AL implementation, primitive generator 460 preferably generates EOFA ordered sets. A buffer data generator 462 is connected to a third data input C of multiplexer 458. In an FC-AL implementation, buffer data generator 462 preferably generates current fill words according to FC-AL protocols. An output of multiplexer 458 is connected to an outgoing loop link 464. Output control circuit 456 is connected to a control input of multiplexer 458 to select the data input of multiplexer 458 to connect to outgoing loop link 464. In addition, output control circuit 456 is preferably connected to primitive generator 460 to control the selection of primitives to be output by primitive generator 460. Outgoing loop link 464 sends data to a downstream node (not shown) in the loop (e.g., data channel 422 leaving error detection device 428 in FIG. 4A).

The operation of error detection device 450 is also similar to that of the hub ports described above with respect to FIGS. 3A and 3B. While valid data and valid primitives are being received on incoming loop link 452, output control circuit 456 selects input A of multiplexer 458 so that the valid data and primitives are output on outgoing loop link 464. Detect circuit 454 monitors the datastream received on incoming loop link 452. When detect circuit 454 detects an invalid primitive inside a data frame, detect circuit 454 sets a frame error flag. Alternatively, detect circuit 454 sets the frame error flag in response to detecting invalid data or invalid primitives inside a data frame. In response to setting of the frame error flag, output control circuit 456 selects data input B of multiplexer 458 so that a valid primitive is substituted for the invalid data or invalid primitive. In addition, detect circuit 454 checks the running disparity of the datastream at the point of the error (i.e., the running disparity of the word preceding the invalid primitive). Detect circuit 454 sends a disparity signal to primitive generator 460 so that primitive generator 460 outputs a primitive which maintains valid running disparity. When detect circuit 454 detects invalid data or an invalid primitive between data frames, detect circuit 454 sets an interframe error flag. In response to setting of the interframe error flag, output control circuit 456 selects data input C of multiplexer 458 so that buffer data is substituted for the invalid data or invalid primitive.

The frame error flag and the interframe error flag are cleared after the detected invalid word (data or primitive) has been properly replaced. After the error flag has been cleared, output control circuit 456 selected input A of multiplexer 458 again so that data on incoming loop link 452 is output by mulitplexor 458. Thus, the detection and replacement of invalid words preferably occurs on a word-by-word basis.

In an FC-AL implementation, when detect circuit 454 detects an ordered set inside a data frame (i.e., after receiving a valid SOF and before receiving a proper succeeding EOF), and that ordered set is not a proper EOF ordered set which terminates the data frame with the correct running disparity, detect circuit 454 sets a frame error flag. An EOF ordered set inside a data frame which does not have the correct running disparity is not a proper EOF ordered set and causes the frame error flag to be set. Any ordered set other than an EOF ordered set inside a data frame is also invalid. In response to setting of the frame error flag, output control circuit 456 selects input B of multiplexer 458 so that a valid primitive is output by multiplexer 458 from primitive generator 460. Primitive generator 460 preferably generates EOFA ordered sets. In addition, output control circuit 456 sends a disparity signal to primitive generator 460 so that primitive generator preferably outputs an EOFA ordered set with correct running disparity.

When detect circuit 454 detects an invalid Fibre Channel word outside a data frame (i.e., after a EOF ordered set has been received and before receiving a succeeding SOF ordered set), detect circuit 454 sets the interframe error flag. Invalid Fibre Channel words outside a data frame include data (actual data must be inside a data frame under FC-AL protocols) and invalid ordered sets. An ordered set may be invalid because the running disparity of the ordered sets is invalid. In response to setting of the interframe error flag, output control circuit 456 selects input C of multiplexer 458 so that a current fill word is output by multiplexer 458. The current fill word is defined by FC-AL protocols. The current fill word is preferably a known good word to be substituted in place of invalid words.

The preferred embodiment has been described along with several alternative embodiments. However, variations which fall within the scope of the following claims are within the scope of the present invention. For example, the detect circuit and the output control circuit may be positioned outside the receive circuit of a hub port. Alternatively, the switching device (e.g., multiplexer 318 in FIG. 3A) may be a cross-point switch. Accordingly, the present invention is not limited to the embodiment described above but only by the scope of the following claims.

What is claimed is:

1. A hub port in a hub for connecting a node port to the hub and for removing invalid data and invalid primitives from a loop network, the hub port comprising:
   (a) a primitive generator, where the primitive generator generates valid primitives and primitives to correct any running disparity;
   (b) a buffer data generator, where the buffer data generator generates buffer data; and
   (c) a detect circuit connected to the node port, where the detect circuit substitutes the valid primitives for invalid primitives detected in data received from the node port, substitutes primitives to correct any running disparity, and substitutes the buffer data for invalid data detected in data received from the node port.

2. The hub port of claim 1 further comprising substituting the valid primitives or the buffer data for detected invalid primitives depending on the nature of the detected invalid primitives.

3. A hub port in a hub for connecting a node port to the hub, the hub port comprising:
   (a) a switching device, including a first data input, a second data input, a third data input, and a control input;
   (b) a node data source connected to the first data input of the switching device and to the node port;
   (c) a primitive generator connected to the second data input of the switching device;
   (d) a buffer data generator connected to the third data input of the switching device;
   (e) a detect circuit connected to the node data source and to the control input of the switching device, where the detect circuit is connected to the primitive generator and the primitive generator generates primitives to correct any running disparity detected in the data from the node data source.

4. The hub port of claim 3 where the switching device further includes a fourth data input connected to a hub data source.

5. The hub port of claim 3 where the hub port is in a Fibre Channel Arbitrated Loop network.

6. A hub port in a hub for connecting a node port to the hub, the hub port comprising:
   (a) a switching device, including a first data input, a second data input, a third data input, and a control input;
   (b) a node data source connected to the first data input of the switching device and to the node port;
   (c) a primitive generator connected to the second data input of the switching device;
   (d) a buffer data generator connected to the third data input of the switching device;
   (e) a detect circuit connected to the node data source and to the control input of the switching device, where the buffer data generator generates current fill words according to Fibre Channel Arbitrated Loop protocols.

7. A hub port in a hub for connecting a node port to the hub, the hub port comprising:
   (a) a switching device, including a first data input, a second data input, a third data input, and a control input;
   (b) a node data source connected to the first data input of the switching device and to the node port;
   (c) a primitive generator connected to the second data input of the switching device;
   (d) a buffer data generator connected to the third data input of the switching device;
   (e) a detect circuit connected to the node data source and to the control input of the switching device, where the primitive generator generates EOFA ordered sets according to Fibre Channel Arbitrated Loop protocols.

8. A hub port in a hub for connecting a node port to the hub, the hub port comprising:
   (a) a switching device, including a first data input, a second data input, a third data input, and a control input;
   (b) a node data source connected to the first data input of the switching device and to the node port;
   (c) a primitive generator connected to the second data input of the switching device;
   (d) a buffer data generator connected to the third data input of the switching device;
   (e) a detect circuit connected to the node data source and to the control input of the switching device, where the data detect circuit detects invalid ordered sets and invalid data according to Fibre Channel Arbitrated Loop protocols.

9. A device comprising:
(a) a switching device, including a first data input, a second data input, a third data input, and a control input;
(b) a data source connected to the first data input of the switching device;
(c) a primitive generator connected to the second data input of the switching device;
(d) a buffer data generator connected to the third data input of the switching device;
(e) a detect circuit connected to the data source and to the control input of the switching device, where the detect circuit is connected to the primitive generator and the primitive generator generates primitives to correct any running disparity detected in the data from the data source.

10. A hub port in a hub for connecting a node port to the hub, the hub port comprising:
(a) a multiplexer including a control input, a first data input, a second data input, and a third data input;
(b) a hub port transmit circuit connected to the node port;
(c) an incoming internal hub link connected to the hub port transmit circuit;
(d) a first data channel connected to the hub port transmit circuit, where the first data channel supplies data from the hub port transmit circuit to the node port;
(e) a hub port receive circuit connected to the hub port transmit circuit and which includes a detect circuit and an output control circuit, where the output control circuit is connected to the control input of the multiplexer, and the hub port receive circuit is connected to the first data input of the multiplexer;
(f) a second data channel connected to the hub port receive circuit, where the second data channel supplies data from the node port to the hub port receive circuit;
(g) an ordered set generator connected to the second data input of the multiplexer;
(h) a current fill word generator connected to the third data input of the multiplexer; and
(i) an outgoing internal hub link connected to the multiplexer.

11. The hub port of claim 10 where the ordered set generator generates EOFA ordered sets according to Fibre Channel Arbitrated Loop protocols.

12. The hub port of claim 10 where the multiplexer further includes a fourth data input connected to the incoming internal hub link.

13. The hub port of claim 10 where the detect circuit is connected to the ordered set generator and the ordered set generator generates ordered sets to correct any running disparity detected in the data from the node port.

14. A hub port for connecting a node port to a hub, where the hub includes a plurality of hub ports, comprising:
(a) a first data channel connecting the hub port to the node port;
(b) a second data channel connecting the node port to the hub port;
(c) an incoming internal hub link connecting the hub port to an upstream hub port;
(d) an outgoing internal hub link connecting the hub port to a downstream hub port;
(e) a data detect circuit coupled to the second data channel;
(f) a primitive generator;
(g) a current fill word generator; and
(h) an output control circuit coupled to the detect circuit, where the output control circuit connects the outgoing internal hub link to one of: the second data channel, the primitive generator, or the current fill word generator,
wherein a the primitive generator generates primitives to correct any running disparity detected in the data from the second data channel.

15. The hub port of claim 14 where the output control circuit connects the outgoing internal hub link to one of: the second data channel, the incoming internal hub link, the primitive generator, or the current fill word generator.

16. A hub port for connecting a node port to a hub, where the hub includes a plurality of hub ports, comprising:
(a) a first data channel connecting the hub port to the node port;
(b) a second data channel connecting the node port to the hub port;
(c) an incoming internal hub link connecting the hub port to an upstream hub port;
(d) an outgoing internal hub link connecting the hub port to a downstream hub port;
(e) a data detect circuit coupled to the second data channel;
(f) a hub port receive circuit coupled to the second data channel;
(g) a primitive generator;
(h) a current fill word generator;
(i) an output control circuit coupled to the detect circuit, where the output control circuit connects the outgoing internal hub link to one of: the hub port receive circuit, the primitive generator, or the current fill word generator,
wherein a the primitive generator generates primitives to correct any running disparity detected in the data from the second data channel.

17. The hub port of claim 16 where the output control circuit connects the outgoing internal hub link to one of: the hub port receive circuit, the incoming internal hub link, the primitive generator, or the current fill word generator.

18. A method for removing invalid data and invalid network primitives from a network, the method comprising:
(a) detecting a running disparity in the network datastream;
(b) generating primitives to correct the running disparity detected in the network datastream;
(c) detecting invalid data in the network datastream;
(d) substituting buffer data for detected invalid data.

19. The method of claim 18 further comprising substituting network primitives or buffer data for detected invalid data depending on the nature of the detected invalid data.

20. The method of claim 18 further comprising substituting network primitives or buffer data for detected invalid network primitives depending on the nature of the detected invalid network primitives.

21. A method of removing invalid data and invalid ordered sets in a Fibre Channel Arbitrated Loop network, the method comprising:
(a) detecting invalid ordered sets between data frames in data received from the node port;
(b) substituting valid ordered sets with correct running disparity for any detected invalid ordered sets between data frames received from the node port;

(c) detecting data between data frames in data received from the node port;

(d) substituting valid ordered sets with correct running disparity for any detected data between data frames received from the node port;

(e) detecting invalid ordered sets inside a data frame received from the node port; and (f) substituting valid ordered sets with correct running disparity for any detected invalid ordered sets inside a data frame received from the node port.

22. The method of claim 21 where the valid ordered sets substituted for detected invalid ordered sets between data frames received from the node port include current fill words.

23. The method of claim 21 where the valid ordered sets substituted for detected data between data frames received from the node port include current fill words.

24. The method of claim 21 where the valid ordered sets substituted for detected invalid ordered sets inside a data frame received from the node port include EOFA ordered sets.

25. A system for removing invalid data and invalid ordered sets in a Fibre Channel Arbitrated Loop network, the system comprising:

(a) means for detecting invalid ordered sets between data frames in data received from the node port;

(b) means for substituting valid ordered sets with correct running disparity for any detected invalid ordered sets between data frames received from the node port;

(c) means for detecting data between data frames in data received from the node port;

(d) means for substituting valid ordered sets with correct running disparity for any detected data between data frames received from the node port;

(e) means for detecting invalid ordered sets inside a data frame received from the node port; and (f) means for substituting valid ordered sets with correct running disparity for any detected invalid ordered sets inside a data frame received from the node port.

26. The system of claim 25 where the valid ordered sets substituted for detected invalid ordered sets between data frames received from the node port include current fill words.

27. The system of claim 25 where the valid ordered sets substituted for detected data between data frames received from the node port include current fill words.

28. The system of claim 25 where the valid ordered sets substituted for detected invalid ordered sets inside a data frame received from the node port include EOFA ordered sets.

* * * * *